United States Patent
Wachs et al.

(10) Patent No.: US 11,204,925 B2
(45) Date of Patent: Dec. 21, 2021

(54) ENABLING DATA SOURCE EXTENSIONS

(71) Applicant: SAP SE, Walldorf (DE)

(72) Inventors: Daniel Wachs, Mannheim (DE); Daniel Niehoff, Sandhausen (DE); Rene Dehn, Sinsheim (DE); Christian Holzer, Ubstadt-Weiher (DE); Karsten Schaser, Wiesloch (DE); Georg Wilhelm, Kronau (DE); Uwe Schlarb, Oestringen (DE); Christian Fuhlbruegge, Spechbach (DE)

(73) Assignee: SAP SE, Walldorf (DE)

( * ) Notice: Subject to any disclaimer, the term of this patent is extended or adjusted under 35 U.S.C. 154(b) by 235 days.

(21) Appl. No.: 15/997,902

(22) Filed: Jun. 5, 2018

(65) Prior Publication Data

US 2019/0370375 A1    Dec. 5, 2019

(51) Int. Cl.
*G06F 16/00*   (2019.01)
*G06F 16/2455*   (2019.01)
*G06F 16/248*   (2019.01)
*G06F 16/25*   (2019.01)
*G06F 16/2457*   (2019.01)

(52) U.S. Cl.
CPC ...... *G06F 16/24553* (2019.01); *G06F 16/248* (2019.01); *G06F 16/24573* (2019.01); *G06F 16/252* (2019.01)

(58) Field of Classification Search
CPC ............ G06F 16/24553; G06F 16/248; G06F 16/252; G06F 16/24573; G06F 16/25; G06F 16/21
See application file for complete search history.

(56) References Cited

U.S. PATENT DOCUMENTS

| 7,263,697 | B2 | 8/2007 | Acker et al. |
| 7,406,695 | B2 | 7/2008 | Dattke et al. |
| 7,424,685 | B2 | 9/2008 | Behrens et al. |
| 7,505,983 | B2 | 3/2009 | Wildhagen et al. |
| 7,533,135 | B2 | 5/2009 | Klein et al. |
| 7,606,820 | B2 | 10/2009 | Stienhans et al. |
| 7,673,245 | B2 | 3/2010 | Weddeling et al. |
| 7,702,626 | B2 | 4/2010 | Dehn et al. |
| 7,730,056 | B2 | 6/2010 | Kaiser et al. |

(Continued)

OTHER PUBLICATIONS

U.S. Appl. No. 15/794,362, filed Oct. 26, 2017, Auer et al.

*Primary Examiner* — Paul Kim
(74) *Attorney, Agent, or Firm* — Fish & Richardson P.C.

(57) ABSTRACT

The present disclosure involves systems, software, and computer implemented methods for enabling data source extensions for individual customers of a cloud platform. One example method includes receiving an extension request, from a particular customer, to extend a data source used to populate an application output. A selection is received of at least one field to be included in a data source extension that extends the data source. Extensibility metadata is stored, in association with the particular customer, that defines the data source extension. The extensibility metadata identifies the data source, the particular customer, and the selected at least one field. A data request is received, from a client device of a user of the customer, for a field included in the data source extension. The data source extension is used to retrieve a field value for the field and the field value is provided in response to the data request.

20 Claims, 10 Drawing Sheets

(56) References Cited

U.S. PATENT DOCUMENTS

| | | |
|---|---|---|
| 7,743,386 B2 | 6/2010 | Beunings et al. |
| 7,756,846 B2 | 7/2010 | Klein et al. |
| 7,778,965 B2 | 8/2010 | Bindewald et al. |
| 7,870,549 B2 | 1/2011 | Acker et al. |
| 8,108,433 B2 | 1/2012 | Baeuerle et al. |
| 8,108,434 B2 | 1/2012 | Schlarb et al. |
| 8,156,172 B2 | 4/2012 | Muehl et al. |
| 8,190,461 B2 | 5/2012 | Hartel et al. |
| 8,356,056 B2 | 1/2013 | Schlarb et al. |
| 8,392,573 B2 | 3/2013 | Lehr et al. |
| 8,417,731 B2 | 4/2013 | Dehn et al. |
| 8,489,640 B2 | 7/2013 | Schlarb et al. |
| 8,560,358 B2 | 10/2013 | Doerfler et al. |
| 8,606,799 B2 | 12/2013 | Dehn et al. |
| 8,694,557 B2 | 4/2014 | Thimmel et al. |
| 8,706,776 B1 | 4/2014 | Kraft et al. |
| 8,819,075 B2 | 8/2014 | Schlarb et al. |
| 8,856,727 B2 | 10/2014 | Schlarb et al. |
| 8,863,005 B2 | 10/2014 | Lehr et al. |
| 8,863,097 B2 | 10/2014 | Thimmel et al. |
| 8,869,105 B2 | 10/2014 | Weller et al. |
| 8,924,269 B2 | 12/2014 | Seubert et al. |
| 8,924,565 B2 | 12/2014 | Lehr et al. |
| 8,938,645 B2 | 1/2015 | Schlarb et al. |
| 8,949,789 B2 | 2/2015 | Schlarb et al. |
| 8,959,117 B2 | 2/2015 | Dehn et al. |
| 9,021,392 B2 | 4/2015 | Baeuerle et al. |
| 9,038,021 B2 | 5/2015 | Schlarb et al. |
| 9,063,958 B2 | 6/2015 | Muller et al. |
| 9,182,994 B2 | 11/2015 | Schlarb et al. |
| 9,208,212 B2 | 12/2015 | Niehoff et al. |
| 9,524,239 B2 | 12/2016 | Wilhelm et al. |
| 9,766,909 B2 | 9/2017 | Dehn et al. |
| 2008/0162415 A1 | 7/2008 | Kaiser et al. |
| 2008/0162457 A1 | 7/2008 | Dehn et al. |
| 2010/0070556 A1 | 3/2010 | Heusermann et al. |
| 2012/0166928 A1 | 6/2012 | Stern et al. |
| 2012/0173581 A1* | 7/2012 | Hartig .............. G06F 11/0745 707/781 |
| 2014/0032441 A1 | 1/2014 | Schlarb et al. |
| 2014/0172775 A1 | 6/2014 | Niehoff et al. |
| 2015/0142781 A1* | 5/2015 | Nigam ................ G06F 16/243 707/722 |
| 2016/0139754 A1* | 5/2016 | Argutin ................ H04L 67/10 715/744 |
| 2018/0004778 A1* | 1/2018 | Roy-Faderman ..... G06F 16/221 |

* cited by examiner

| | | |
|---|---|---|
| MODEL_KEY | MODEL_KEY1 | 902 |
| ENTITY NAME | ContactPerson | 904 |
| FIELD NAME | YY1_CONTACT | 906 |
| | | |
| ODATA EXTERNAL FIELD NAME | YY1_CONTACT | 908 |
| MAPPING PATH | CONTACT | 910 |
| CDS SOURCE VIEW NAME | IVIEW_CONTACT_PERSON | 912 |
| CDS SOURCE FIELD NAME | CONTACT | 914 |

```
                  ,--- 952
extend view CONSUMPTIONVIEW1_ITEM_QUERY with YY1_ExtensionID1
{
     SALESORDERITEMCUBE.GROSSAMOUNT as YY1_GrossAmount
}        \___ 956        \___ 954                      \___ 958
```

ENABLING DATA SOURCE EXTENSIONS

TECHNICAL FIELD

The present disclosure relates to computer-implemented methods, software, and systems for enabling data source extensions for individual customers of a cloud platform.

BACKGROUND

A database view is a result set of a query that is generally not stored in a physical schema of the database. A view can be treated as a virtual table that is created dynamically when the view is requested. A view can provide a subset of data in a table and can be customized to include data needed for a particular context. Multiple views on a same table can be created, each designed for a particular use of a particular subset of data in the table.

SUMMARY

The present disclosure involves systems, software, and computer implemented methods for enabling data source extensions for individual customers of a cloud platform. One example method includes receiving an extension request, from a particular customer, to extend a data source used to populate an application output of an application used by multiple customers of a cloud platform. Selection is received, of at least one field to be included in a data source extension that extends the data source. The at least one field is not included in the data source. Extensibility metadata is stored, in association with the particular customer, that defines the data source extension. The extensibility metadata identifies the data source, the particular customer, and the selected at least one field. A data request is received, from a client device of a user of the customer, for a field included in the data source extension. The data source extension is used to retrieve a field value for the field. The field value is provided in response to the data request.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 9A illustrates an example mapping extension.

FIG. 9B illustrates an example extend view statement.

DETAILED DESCRIPTION

Figure 1:
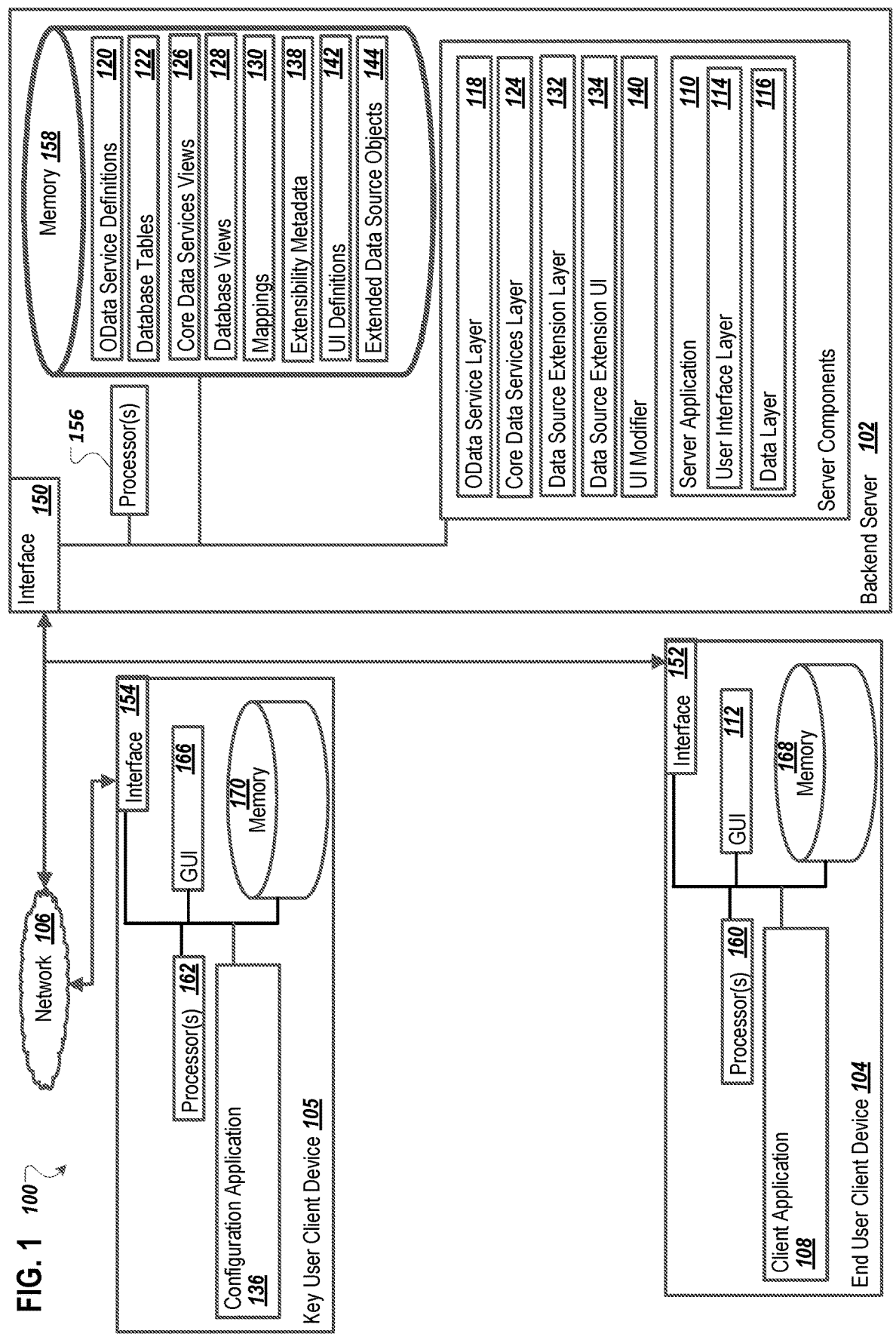
FIG. 1 is a block diagram illustrating an example system for enabling data source extensions for individual customers of a cloud platform.

A cloud platform can serve multiple tenants, or customers. Each tenant can have different database and user interface needs. The cloud platform can enable user interface customization for a particular customer, for example. Populating application user interfaces can include retrieving data from one or more data sources. An application can be configured to retrieve all data fields that may be needed collectively for the multiple customers that are served by the cloud platform. However, retrieving all data that may be needed may negatively impact performance, since a given customer may only need a subset of data that is used by all of the customers of the cloud platform. Additionally, customers may need other data fields in the future, so specifying upfront which data fields may eventually be needed may be impractical, if not impossible. Also, developers may be overwhelmed or inconvenienced if they have to pick specific data fields for a particular use case from an extensive list of available fields used for multiple customers, as most of the available fields may be irrelevant for the particular use case while relevant for others.

A data source extension approach can be used to provide a solution for customer extensibility needs without resulting in the performance and maintenance issues described above. For example, a default user interface can be provided, that includes a base set of user interface controls that present and/or allow modification to a base set of data fields. A base data source can be provided that provides the base set of data fields. Data source extension functionality can be provided that enables a given customer to modify, for that customer, a base data source, where modifying the base data source allows the user to include one or more data fields that are not included in the base data source. User interface customization functionality can be provided that enables a customer to create a modified user interface, for use by that customer, that includes field(s) included in a data source extension created by that customer.

A customer can be represented as one or more tenants in the cloud platform. A particular customer can be represented as different tenants if the customer uses different cloud applications provided by the cloud platform, for example. A data source extension can be generated for a particular cloud platform tenant.

The creation of a data source extension for a given customer can be performed so that the data source extension does not affect other customers, such as customers who create their own data source extension(s) or customers who only need data from a base data source. Data source extensions can be created in a lifecycle-stable fashion so that a data source extension added a given point in time does not conflict with database changes or other data source extensions that are added at a later point in time. Allowing data source and user interface extensions on a per customer basis, while serving an application for multiple customers, can result in improved performance, maintainability, quality, and acceptance of the application, as compared to other approaches.

FIG. 1 is a block diagram illustrating an example system 100 for enabling data source extensions for individual customers of a cloud platform. Specifically, the illustrated system 100 includes or is communicably coupled with a server 102, an end-user client device 104, a key user (e.g., administrator) client device 105, and a network 106. Although shown separately, in some implementations, functionality of two or more systems or servers may be provided by a single system or server. In some implementations, the functionality of one illustrated system, server, or component may be provided by multiple systems, servers, or components, respectively. The system 100 can support multi-tenancy. The server 102 (and possibly other servers) may be included as part of the cloud platform.

An end user of a customer of the cloud platform uses the end user client device 104 to execute a client application 108 version of a server application 110 running on the server 102. The client application 108 can present user interfaces on a GUI (Graphical User Interface) 112 of the end user client device. A user interface layer 114 can generate various types of user interfaces for presentation in the GUI_112, including interactive user interfaces, forms, documents, electronic messages, or other types of application outputs.

A data layer 116 can receive data to present in a user interface from one or more data sources. For example, the data layer 116 can use an OData services layer 118 to get data defined by an OData service definition 120. An OData service definition 120 can specify that data is to be retrieved from one or more data entities that store data in one or more database tables 122.

As another example, the data layer 116 can use a core data services (CDS) layer 124 to get data defined by a core data services view 126. A CDS view 126 can be associated with a database view 128. A CDS view 126 can enhance a database view 128 with business logic and/or presentation information, for example. A database view 128 can retrieve data from one or more database tables 122. A given CDS view 126 can be associated with (e.g., select data from) one or more other CDS views 126. An OData service definition 120 can specify that an OData service is to retrieve data from one or more CDS views 126. A mapping 130 can specify which CDS views 126 are used by which OData services.

As mentioned above, the server 102 can provide the server application 110 to multiple, different customers, with some customers wanting custom user interfaces, custom data sources, or other application customizations. A data source extension layer 132 can enable a given customer to extend a data source. A data source extension can be a mapping extension if an OData service is extended or a view extension if a CDS view is extended.

The data source extension layer 132 can provide a data source extension user interface 134 that can be used by a key user (e.g., an administrator) of the customer to select fields for a data source extension. For example, the data source extension user interface 134 can be presented in a configuration application 136 running on the key user client device 105. After the key user has selected field(s) for a data source extension, extensibility metadata 138 that describes the selections can be stored in an extensibility repository associated with the customer. The extensibility metadata can map fields that are included in a data source extension to standard database fields included in the database tables 122.

A UI modifier tool 140 can be included in the configuration application 136 and used by a key user of a customer to customize a user interface for the customer. The UI modifier tool 140 can enable the key user to select field(s) to be added to a user interface, including fields that have been included in a data source extension. The UI modifier tool 140 can enable modification of various types of user interfaces and application outputs (e.g., interactive control-driven user interfaces, forms, documents, electronic messages, etc.). User interface definitions 142 can include UI customizations made using the UI modifier tool 140.

At runtime, when a customized user interface is presented in the client application 108, an extended data source 144 can be generated, based on the extensibility metadata 138 and a corresponding OData service definition 120 or CDS view 126. That is, data to present in the user interface can be retrieved, using the original data source and the data generated based on a data source extension.

As used in the present disclosure, the term "computer" is intended to encompass any suitable processing device. For example, although FIG. 1 illustrates a single server 102, a single end-user client device 104, and a single key user client device 105, the system 100 can be implemented using a single, stand-alone computing device, two or more servers 102, or multiple client devices. Indeed, the server 102 and the client devices 104 and 105 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the server 102 and the client devices 104 and 105 may be adapted to execute any operating system, including Linux, UNIX, Windows, Mac OS®, Java™, Android™, iOS or any other suitable operating system. According to one implementation, the server 102 may also include or be communicably coupled with an e-mail server, a Web server, a caching server, a streaming data server, and/or other suitable server.

Interfaces 150, 152, and 154 are used by the server 102, the end-user client device 104, and the key user client device 105, respectively, for communicating with other systems in a distributed environment—including within the system 100—connected to the network 106. Generally, the interfaces 150, 152, and 154 each comprise logic encoded in software and/or hardware in a suitable combination and operable to communicate with the network 106. More specifically, the interfaces 150, 152, and 154 may each comprise software supporting one or more communication protocols associated with communications such that the network 106 or interface's hardware is operable to communicate physical signals within and outside of the illustrated system 100.

The server 102 includes one or more processors 156. Each processor 156 may be a central processing unit (CPU), a blade, an application specific integrated circuit (ASIC), a field-programmable gate array (FPGA), or another suitable component. Generally, each processor 156 executes instructions and manipulates data to perform the operations of the server 102. Specifically, each processor 156 executes the functionality required to receive and respond to requests from the end-user client device 104, for example.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The server 102 includes memory 158. In some implementations, the server 102 includes multiple memories. The memory 158 may include any type of memory or database module and may take the form of volatile and/or non-volatile memory including, without limitation, magnetic media, optical media, random access memory (RAM), read-only memory (ROM), removable media, or any other suitable local or remote memory component. The memory 158 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the server 102.

The end-user client device 104 and the key user client device 105 may each generally be any computing device operable to connect to or communicate with the server 102 via the network 106 using a wireline or wireless connection. In general, the end-user client device 104 and the key user client device 105 each comprise an electronic computer device operable to receive, transmit, process, and store any appropriate data associated with the system 100 of FIG. 1. The end-user client device 104 and the key user client device 105 can each include one or more client applications, including the client application 108 or the configuration application 136, respectively. A client application is any type of application that allows the end-user client device 104 or the key user client device 105 to request and view content on a respective client device. In some implementations, a client application can use parameters, metadata, and other information received at launch to access a particular set of data from the server 102. In some instances, a client application may be an agent or client-side version of the one or more enterprise applications running on an enterprise server (not shown).

The client device 104 and the key user client device 105 respectively include processor(s) 160 or processor(s) 162. Each processor 160 or 162 included in the end-user client device 104 or the key user client device 105 may be a central processing unit (CPU), an application specific integrated circuit (ASIC), a field-programmable gate array (FPGA), or another suitable component. Generally, each processor 160 or 162 included in the end-user client device 104 or the key user client device 105 executes instructions and manipulates data to perform the operations of the end-user client device 104 or the key user client device 105, respectively. Specifically, each processor 160 or 162 included in the end-user client device 104 or the key user client device 105 executes the functionality required to send requests to the server 102 and to receive and process responses from the server 102.

The end-user client device 104 and the key user client device 105 are each generally intended to encompass any client computing device such as a laptop/notebook computer, wireless data port, smart phone, personal data assistant (PDA), tablet computing device, one or more processors within these devices, or any other suitable processing device. For example, the end-user client device 104 and/or the key user client device 105 may comprise a computer that includes an input device, such as a keypad, touch screen, or other device that can accept user information, and an output device that conveys information associated with the operation of the server 102, or the respective client device itself, including digital data, visual information, or the GUI_112 or a GUI 166, respectively.

The GUIs 112 and 166 interface with at least a portion of the system 100 for any suitable purpose, including generating a visual representation of the client application 108 or the configuration application 136, respectively. In particular, the GUI 112 and/or the GUI_166 may be used to view and navigate various Web pages. Generally, the GUI_112 and the GUI_166 provide a respective user with an efficient and user-friendly presentation of business data provided by or communicated within the system. The GUI 112 and the GUI_166 may each comprise a plurality of customizable frames or views having interactive fields, pull-down lists, and buttons operated by the user. The GUI_112 and the GUI_166 each contemplate any suitable graphical user interface, such as a combination of a generic web browser, intelligent engine, and command line interface (CLI) that processes information and efficiently presents the results to the user visually.

Memory 168 and memory 170 included in the end-user client device 104 or the key user client device 105, respectively, may each include any memory or database module and may take the form of volatile or non-volatile memory including, without limitation, magnetic media, optical media, random access memory (RAM), read-only memory (ROM), removable media, or any other suitable local or remote memory component. The memory 168 and the memory 170 may each store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the associated client device.

There may be any number of end-user client devices 104 and/or key user client devices 105 associated with, or external to, the system 100. For example, while the illustrated system 100 includes one end-user client device 104, alternative implementations of the system 100 may include multiple end-user client devices 104 communicably coupled to the server 102 and/or the network 106, or any other number suitable to the purposes of the system 100. Additionally, there may also be one or more additional end-user client devices 104 external to the illustrated portion of system 100 that are capable of interacting with the system 100 via the network 106. Further, the term "client", "client device" and "user" may be used interchangeably as appropriate without departing from the scope of this disclosure. Moreover, while the end-user client device 104 and the key user client device 105 may be described in terms of being used by a single user, this disclosure contemplates that many users may use one computer, or that one user may use multiple computers.

Figure 2:
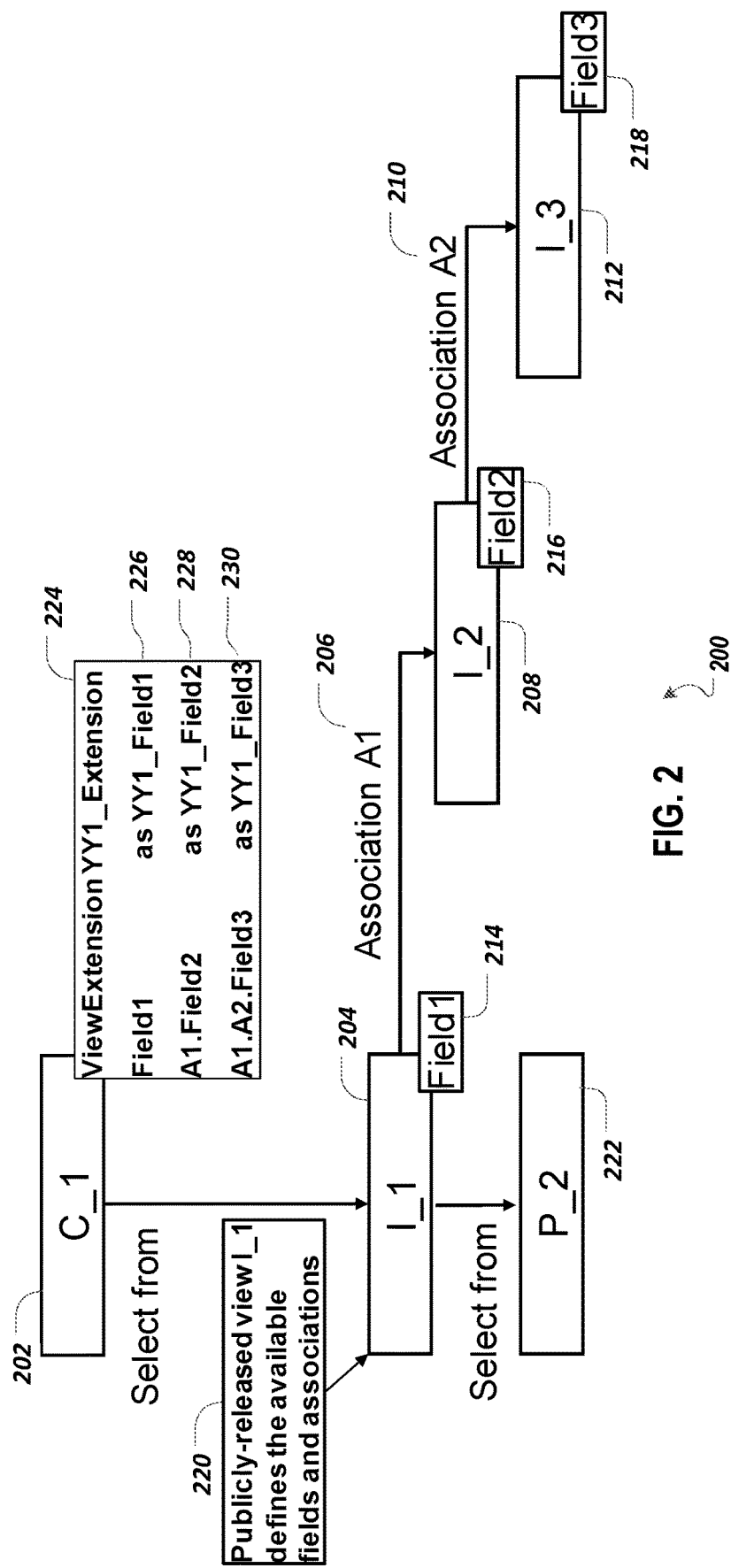
FIG. 2 is a graph that illustrates relationships between views and a view extension.

FIG. 2 is a graph 200 that illustrates relationships between views and a view extension. A database system can include different types of views. A consumption view C_1 202 selects data from an interface view I_1 204. A consumption view can designed for a specific application purpose and can have fewer fields that other types of views. Interface views can form a public database interface for application developers that includes fields and associations that are stable from release to release. The interface view I_1 204 has an association A1 206 with an interface view I_2 208. The interface view I_2 208 has an association A2 210 with an interface view I_3 212. The interface views I_1 204, I_2 208, and I_3 212 respectively include Field1 214, Field2 216, and Field3 218 fields. As indicated by a note 220, the I_1 view 204 is a publicly released view that defines fields (e.g., the Field1 214, Field2 216, and Field3 218 fields) that are available in the I_1 view interface 204 or in a view that is directly (e.g., the I_2 view 208) or indirectly (e.g., the interface view I_3 212) associated with the I_1 interface view 204. The interface view I_1 204 selects data from a private view P_2 222. The private view P_2 222 is not publicly released and may be changed in (or deleted from) future releases. Fields in private views are generally not available for view extensions.

Fields included in interface views can be added to a data source extension. For example, a view extension YY1_Extension 224 has been defined that includes YY1_Field1 226, YY1_Field2 228, and YY1_Field3 230 fields. The YY1_Field1 field 226 corresponds to the Field1 field 214 in the interface view I_1 204. The YY1_Field2 field 228 corresponds to the Field2 field 216 included in the I_2 interface view 208 that can be obtained using the A1 association 206. The YY1_Field3 field 230 corresponds to the Field3 field 218 that is included in the interface view I_3 212 that can be obtained using the A1 association 206 and the A2 association 210.

The public releasing of the interface views 204, 208, and 212 means that developers are specifying that fields included in the interface views 204, 208, 212, and associations between the interface views 204, 208, 212 are part of a public interface that should remain unchanged between releases. The public releasing, or publishing, of an interface view can be a lifecycle stability contract offered by the provider of the cloud platform that signals to customers that fields in the interface views will be available in future releases. Data source extensions and fields that are included in data source extensions can be named using a namespace of the customer (e.g., YY1 in the examples of FIG. 2), to avoid naming collisions with fields that may be added, in the future, by the provider of the cloud platform.

Figure 3:
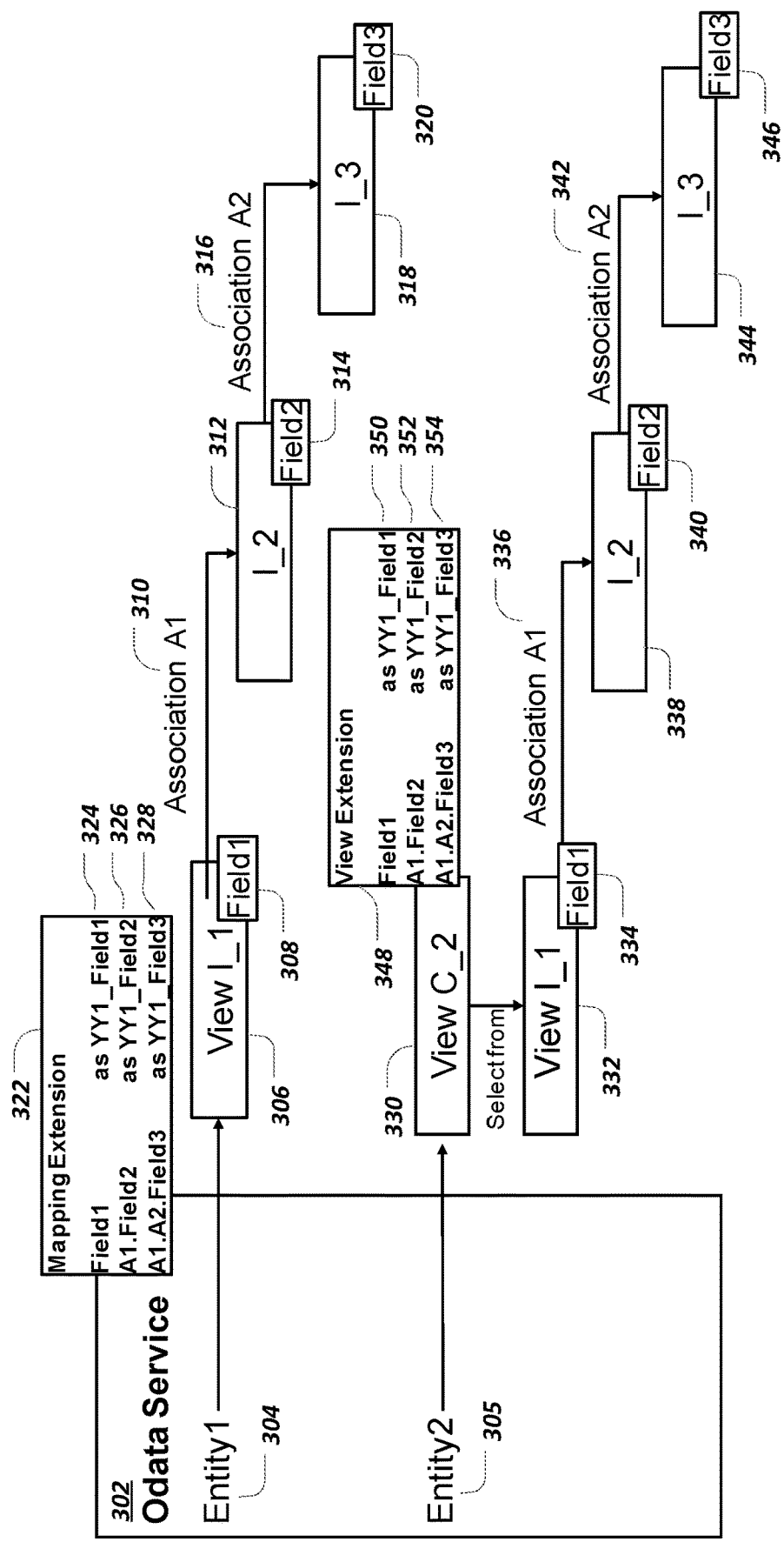
FIG. 3 is a graph that illustrates the extending of an OData service.

FIG. 3 is a graph 300 that illustrates the extending of an OData service. An OData Service 302 includes a first entity 304 and a second entity 305. The first entity 304 reads data from an interface view I_1 306 that includes a Field1 field 308 and has an association A1 310 with an interface view I_2 312. The interface view I_2 312 includes a Field2 field 314 and has an association A2 316 with an interface view I_3 318. The interface view I_3 has a Field3 field 320.

A mapping extension 322 has been defined for the OData service 302. The mapping extension 322 can be defined based on a customer desiring additional fields in the OData service 302. The mapping extension 322 includes a YY1_Field1 field 324, a YY1_Field2 field 326, and a YY1_Field3 field 328. The YY1_Field1 field 324 corresponds to the Field1 field 308 of the interface view I_1 306. The YY1_Field2 field 326 corresponds to the Field2 field 324 of the interface I_2 312 that is accessible using the A1 association 310. The YY1_Field3 field 328 corresponds to the Field3 field 320 of the interface view I_3 318 that is accessible using the A1 association 310 and the A2 association 316.

The second entity 305 reads data from a consumption view C_2 330. The consumption view C_2 330 selects data from an interface view I_1 332. The interface view I_1 332 includes a Field1 field 334 and has an association A1 336 with an interface view I_2 338. The interface view I_2 338 includes a Field2 field 340 and has an association A2 342 with an interface view I_3 344. The interface view I_3 has a Field3 field 346.

A view extension 348 has been defined for the consumption view 330. The view extension 348 includes a YY1_Field1 field 350, a YY1_Field2 field 352, and a YY1_Field3 field 354. The YY1_Field1 field 350 corresponds to the Field1 field 334 of the interface view I_1 332. The YY1_Field2 field 352 corresponds to the Field2 field 340 of the interface I_2 338 that is accessible using the A1 association 336. The YY1_Field3 field 354 corresponds to the Field3 field 346 of the interface view I_3 344 that is accessible using the A1 association 336 and the A2 association 342.

Figure 4:
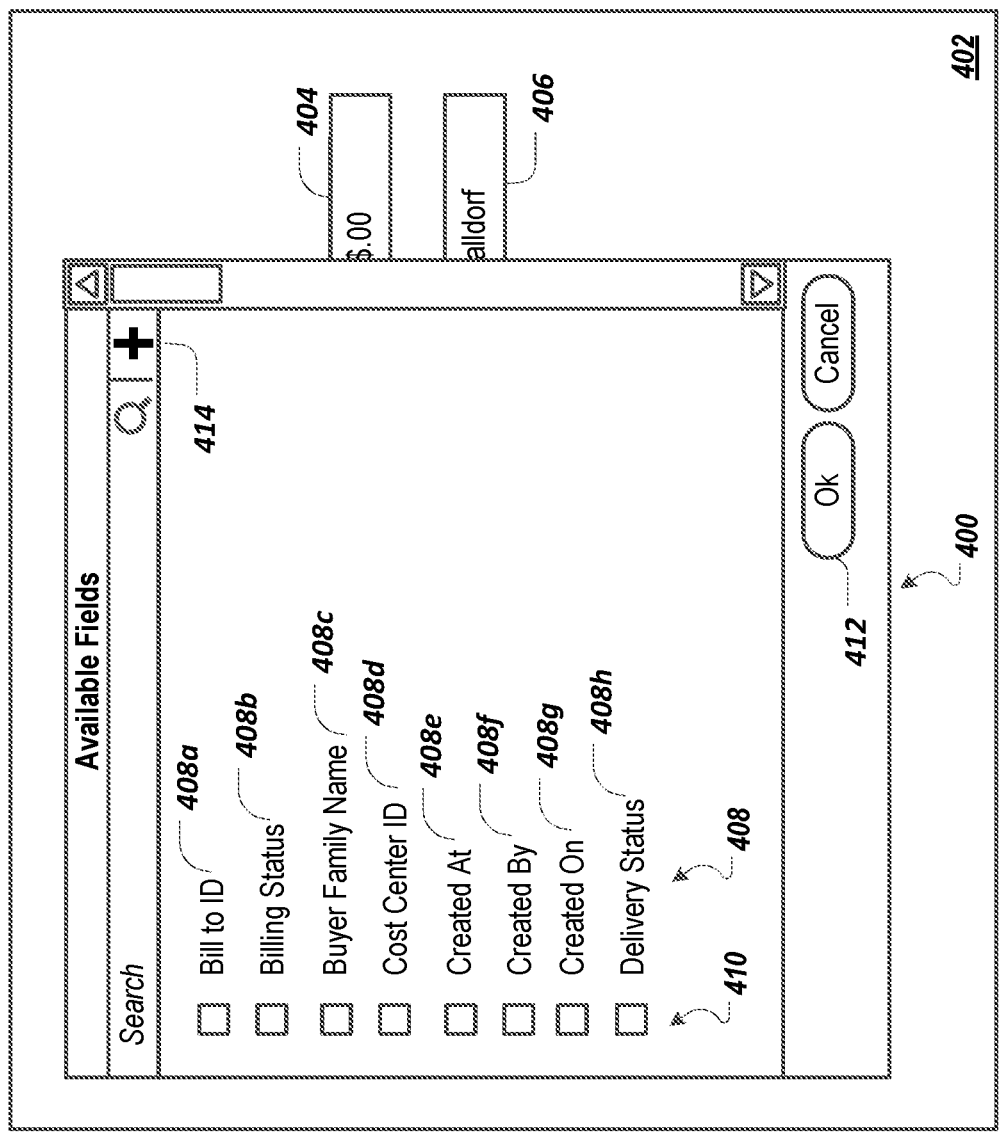
FIG. 4 is an example configuration user interface for adapting an application user interface.

FIG. 4 is an example configuration user interface 400 for adapting an application user interface 402. The configuration user interface 400 can be used, for example, to add additional fields to the application user interface 402, to be displayed in the application user interface 402 with, for example, existing fields 404 and 406. The configuration user interface 400 includes a list 408 of available fields 408a-408h that are available to be added to the application user interface 402. The available fields can include fields that are available in an OData service that is associated with the application user interface 402 but that have not yet been added to the application user interface 402.

To add one or more available fields to the application user interface 402, respective check box(es) 410 can be selected for corresponding field(s) to be added, and an Ok button 412 can be selected. The configuration user interface 400 includes a control 414 that can be selected to create a data source extension. In response to selection of the control 414, a data source extension creation user interface can be presented, as described below.

Figure 5:
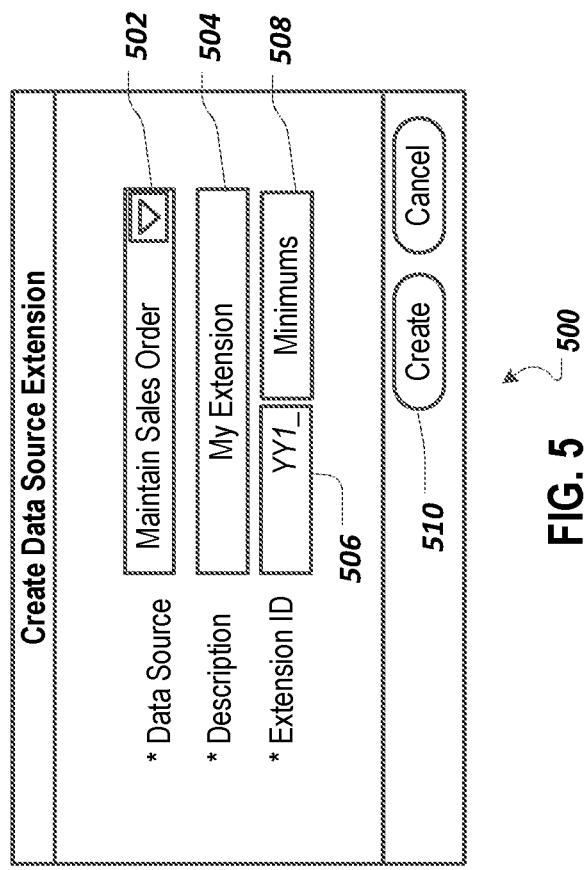
FIG. 5 is an example data source extension creation user interface.

FIG. 5 is an example data source extension creation user interface 500. The data source extension creation user interface 500 can be used to provide information for creation of a data source extension. A data source selection control 502 can be used to select an existing data source (e.g., "Maintain Sales Order"). A description of the data source extension (e.g., "My Extension") can be entered in a description field 504.

Identifier controls 506 and 508 can be used to specify an identifier for the data source extension. The identifier control 506 can display an automatically generated identifier prefix (e.g., "YY1_") that is to be used for the data source extension identifier. The automatically generated prefix can be appended to a user-specified identifier (e.g., "Minimums") entered in the identifier control 508. The automatically generated prefix can be selected so that a combined data source extension identifier presented in the identifier controls 506 and 508 will be unique within the system. A create control 510 can be selected to create the data source extension according to the contents of the data source extension creation user interface 500. After the data source extension has been created, fields can be selected for the extension, as described below.

Figure 6:
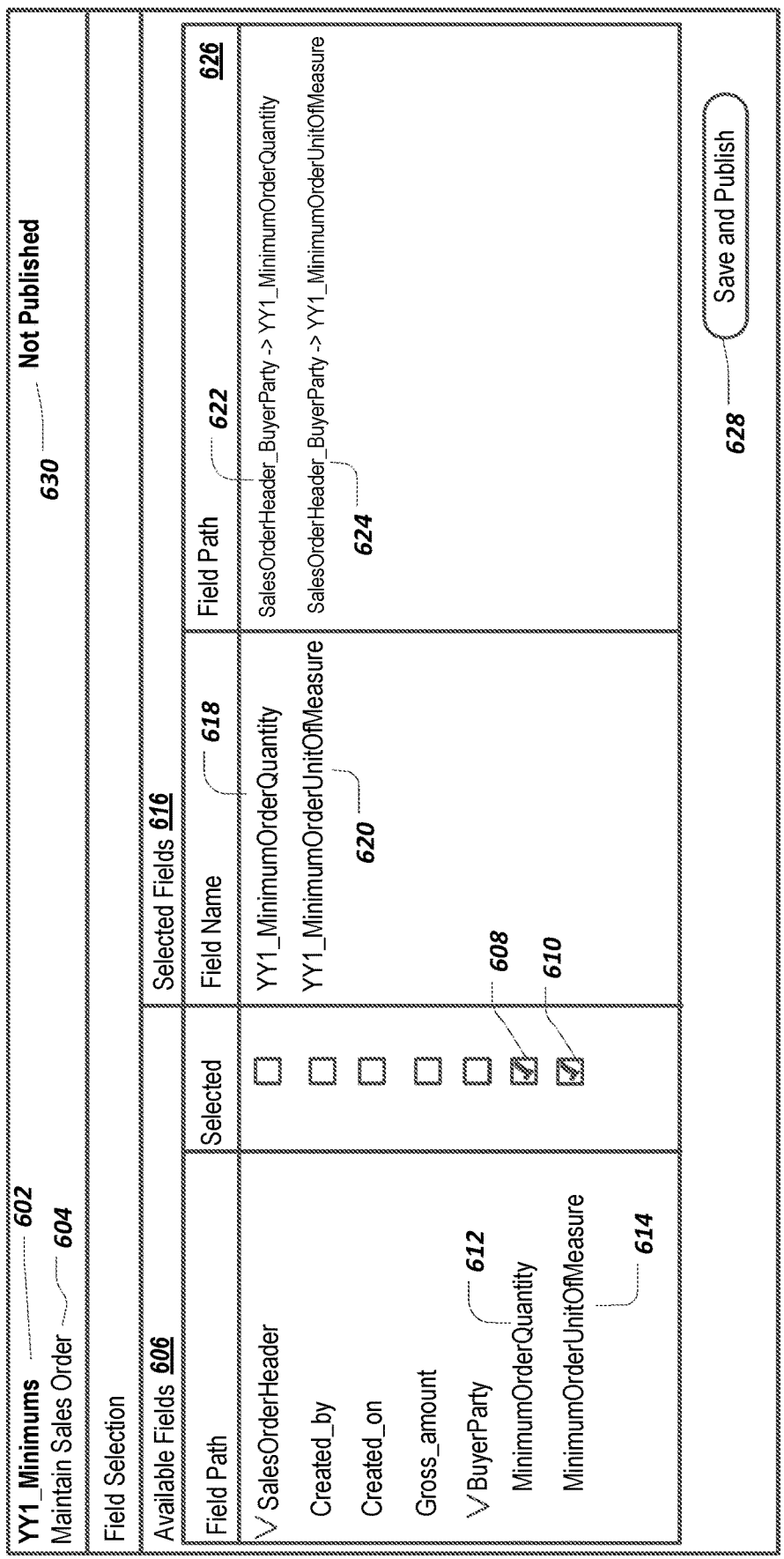
FIG. 6 is an example field selection user interface.

FIG. 6 is an example field selection user interface 600. The field selection user interface 600 can be used to select fields to be included in a data source extension. A name 602 and data source 604 of the data source extension are displayed. An available fields area 606 displays fields which can be added to the data source extension. Fields can be organized by OData entities and by views that are associated with respective OData entities. The user can select a respective check box adjacent to a field to cause the field to be added to the data source extension. For example, check boxes 608 and 610 have been selected to add a minimum order quantity field 612 and a minimum order unit of measure field 614, respectively.

Selected fields are displayed in a selected fields area 616. Selected fields have an associated field name with includes a prefix associated with the data source extension. For example, selected fields 618 and 620, corresponding to the minimum order quantity field 612 and the minimum order unit of measure field 614, respectively, are displayed in the selected fields area 616, with appended "YY1_" prefixes that correspond to a "YY1_" prefix included in the data source extension name 602. Field path values 622 and 624, corresponding to the selected fields 618 and 620, respectively, can be shown in a field path area 626. A respective field path can show a hierarchy of entities (e.g., SalesOrderHeader, BuyerParty) to which a selected field belongs.

A key user can select a save-and-publish control 628 to save and publish the data source extension. Once published, fields included in a data source extension can be added to one or more user interfaces. After selection of the save-and-publish control 628, a status label 630 can be changed from an "unpublished" value to a "published" value.

Figure 7:
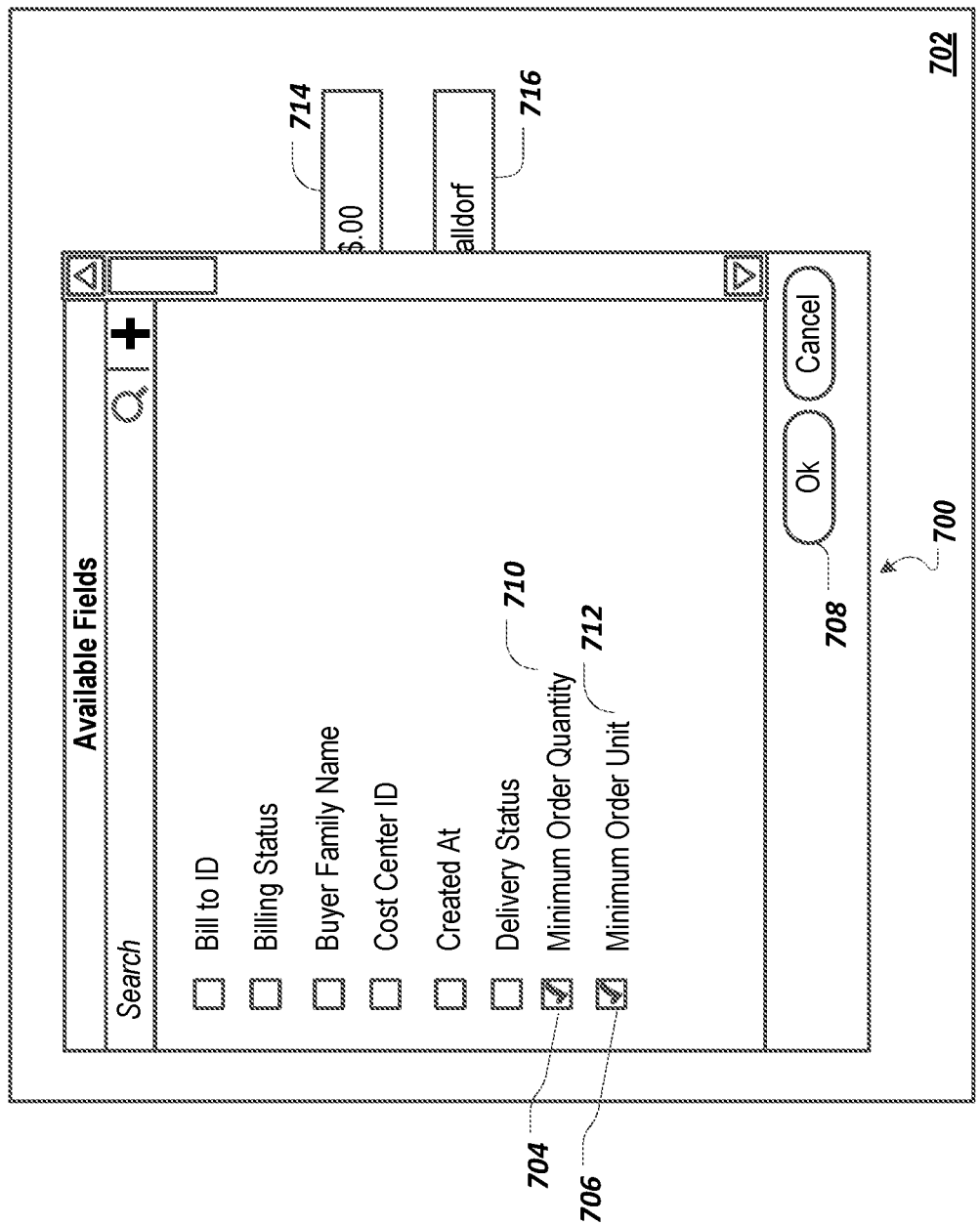
FIG. 7 is an example configuration user interface for adapting an application user interface to include one or more fields included in a data source extension.

FIG. 7 is an example configuration user interface 700 for adapting an application user interface 702 to include one or more fields included in a data source extension. A key user can select check boxes 704 and 706 and a control 708 to cause a minimum order quantity field 710 and a minimum order unit field 712 to be added to the application user interface 702, along with existing application user interface controls 714 and 716 (among possibly other existing user interface controls that are hidden by the configuration user interface 700). The minimum order quantity field 710 and the minimum order unit field 712 are included in a data source extension and are shown as available fields (along with other available fields).

Figure 8:
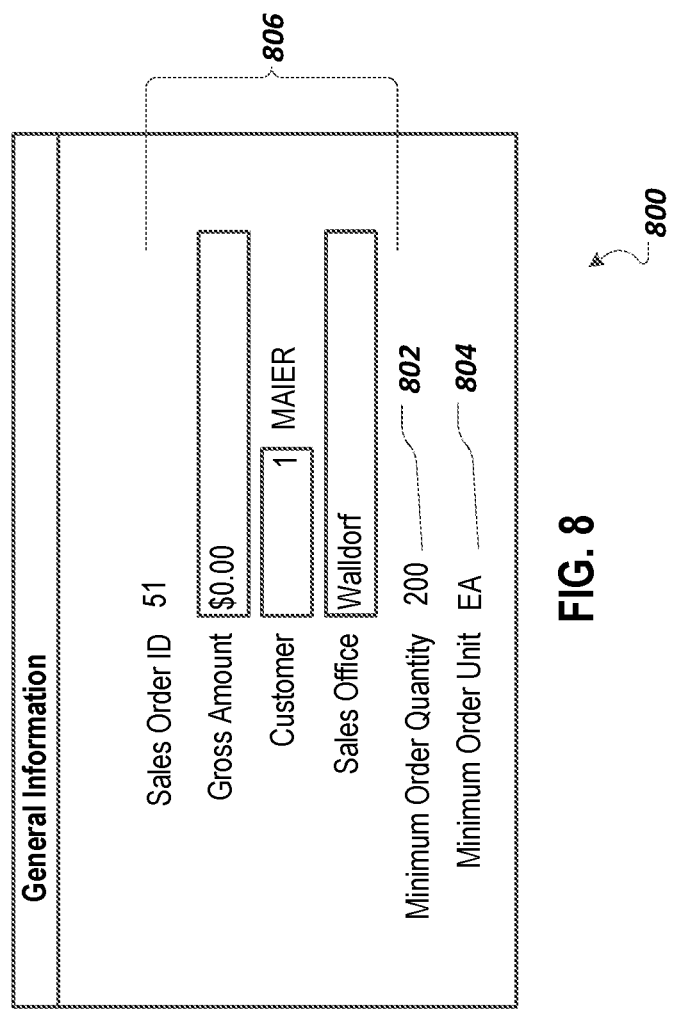
FIG. 8 is a user interface that includes new user interface controls for displaying information from fields of a data source extension.

FIG. 8 is a user interface 800 that includes new user interface controls for displaying information from fields of a data source extension. The user interface 800 includes a minimum order quantity control 802 that is displaying a value for a minimum order quantity field included in a data source extension. Similarly, the user interface 800 includes a minimum order unit field 804 that is displaying a value for a minimum order unit field included in the data source extension. The user interface controls 802 and 804 have been added to the user interface 800 to be displayed along with previously added user interface controls 806.

FIG. 9A illustrates an example mapping extension 900. The mapping extension 900 maps a field in an OData service to a field in a CDS view. A model key 902 identifies the OData service. An entity name 904, a field name 906, and an external field name 908 define a field that has been added to the OData service as an extension of the OData service. A mapping path 910 and a source view name 912 indicate a CDS view that includes the field that was added to the OData service. A CDS field name 914 indicates which field in the CDS view was added to the OData service.

FIG. 9B illustrates an example extend view statement 950. The extend view statement 950 can be included in extensibility metadata when a data source extension is a view extension. The extend view statement 950 extends a CONSUMPTIONVIEW1_ITEM_QUERY CDS view 952 to include a GROSSAMOUNT field 954 that is available from a SALESORDERITEMCUBE entity 956. The GROSSAMOUNT field 954 will be known as a YY1_GrossAmount field 958 in the view extension.

Figure 10:
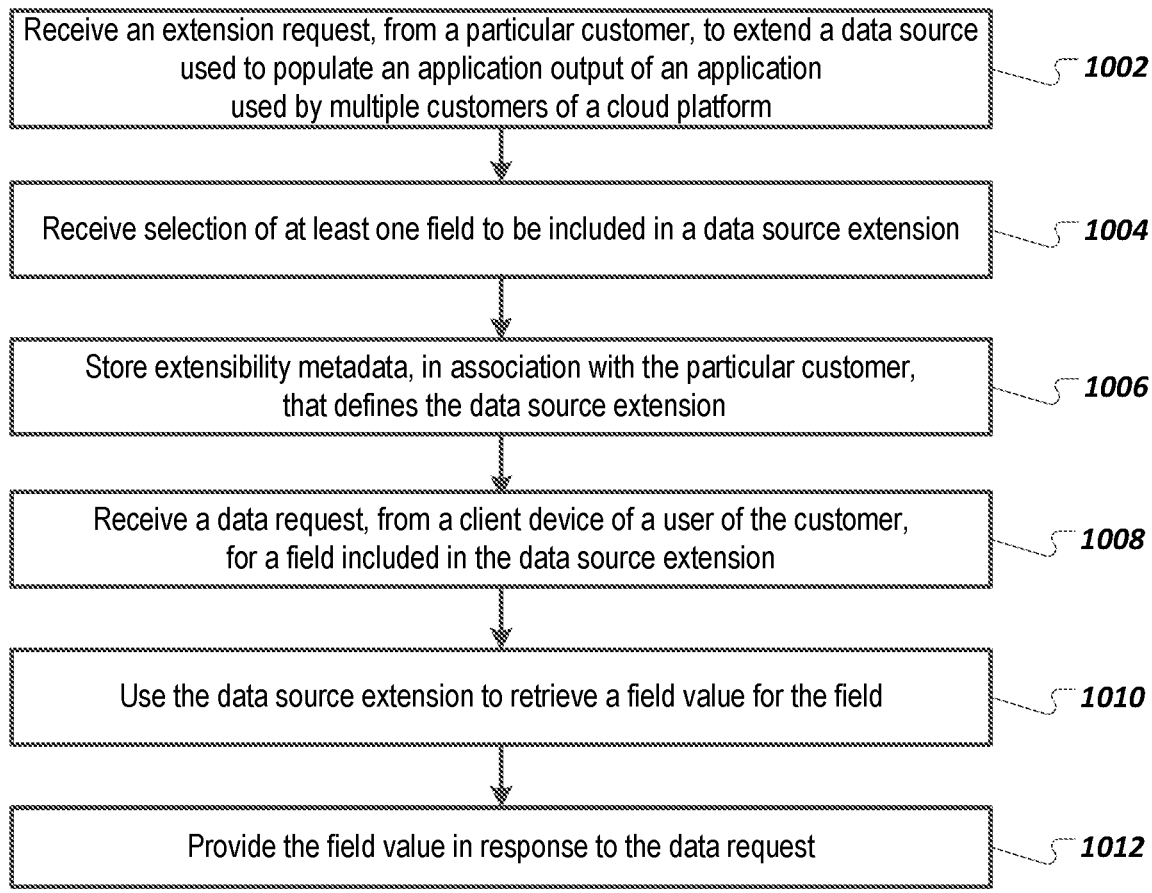
FIG. 10 is a flowchart of an example method for enabling data source extensions for individual customers of a cloud platform.

FIG. 10 is a flowchart of an example method 1000 for enabling data source extensions for individual customers of a cloud platform. It will be understood that method 1000 and related methods may be performed, for example, by any suitable system, environment, software, and hardware, or a combination of systems, environments, software, and hardware, as appropriate. For example, one or more of a client, a server, or other computing device can be used to execute method 1000 and related methods and obtain any data from the memory of a client, the server, or the other computing device. In some implementations, the method 1000 and related methods are executed by one or more components of the system 100 described above with respect to FIG. 1. For example, the method 1000 and related methods can be executed by the data source extension layer of FIG. 1.

At 1002, an extension request is received, from a particular customer, to extend a data source used to populate an application output of an application used by multiple customers of a cloud platform is identified. The data source can be an OData service or an enhanced database view. The enhanced database view can enhances a database view in a database of the cloud platform, with processing logic and/or data presentation information. The application output can be presented in an interactive user interface, in an electronic document, or some other type of application output. The extension request can be received by an administrator user of the customer. The administrator user may have received a request from an end user regarding a need for a new field in the application output. The administrator user can be presented a list of data sources that are relevant to the application output and can select the data source from the presented list of data sources.

At 1004, selection of at least one field to be included in a data source extension that extends the data source is received. The at least one field is not included in the data source at the time of the extension request. The selection can be received from an extension user interface that is presented to the customer and that enables selection of the at least one field.

At 1006, extensibility metadata is stored, in association with the particular customer. The extensibility metadata defines the data source extension and identifies the data source, the particular customer, and the selected at least one field.

At 1008, a data request is received, from a client device of a user of the customer, for a field included in the data source extension. The data request can be received from the application when the application generates the application output. The application can be configured to include the field in the application output based on the customer having modified the application output to include the field. A modification tool can be presented to the customer, after the data source has been extended, to enable the customer to modify the application output to include the field that is included in the data source extension.

At 1010, the data source extension is used to retrieve a field value for the field.

At 1012, the field value is provided in response to the data request.

The included figures and accompanying description illustrate example processes and computer-implementable techniques. But the system (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A method comprising:
   receiving an extension request, from a particular customer of a plurality of customers, to extend a data source used to populate an application output of an application used by the plurality of customers of a cloud platform;
   automatically generating a data source extension (DSE) identifier (ID) prefix for a DSE that extends the data source, wherein a DSE ID comprises the automatically generated DSE ID prefix and a user-specified ID, and wherein the DSE ID and the automatically generated DSE ID prefix are unique and specific to the particular customer of the plurality of customers;
   receiving selection of at least one field to be included in the DSE that extends the data source, wherein the at least one field is not included in the data source, and wherein the selected at least one field has an associated field name comprising at least the automatically generated DSE ID prefix;
   storing extensibility metadata, in association with the particular customer of the plurality of customers, that defines the DSE, the extensibility metadata identifying the DSE ID, the automatically generated DSE ID prefix, the data source, the particular customer, and the selection of the at least one field that is not included in the data source;
   generating, at a first point in time, the DSE for the particular customer based on the extensibility metadata, wherein the DSE is specific to and is only applied to the particular customer of the plurality of customers;
   in response to generating, at the first point in time, the DSE for the particular customer based on the extensibility metadata, preventing the generated DSE from conflicting with other DSEs generated after the first point in time based on the DSE being specific to and only applied to the particular customer and the DSE ID and the automatically generated DSE ID prefix being unique and specific to the particular customer;
   receiving a data request, from a client device of a user associated with the particular customer, for a field included in the DSE that is not included in the data source;
   using the DSE to retrieve a field value for the field included in the DSE that is not included in the data source based on the user being associated with the particular customer; and
   providing the field value in response to the data request.

2. The method of claim 1, wherein the data source is an OData service, wherein using the DSE to retrieve a field value for the field included in the DSE that is not included in the data source comprises:
   mapping, using a mapping extension, the field in the OData service to a field in a core data service (CDS) view based on the extensibility metadata, wherein the extensibility metadata further comprises an extend view statement including the CDS view, the DSE ID, and a CDS field name associated with the field in the CDS view, and wherein the CDS field name comprises the automatically generated DSE ID prefix.

3. The method of claim 1, wherein the data source is an enhanced database view that enhances a database view in a database of the cloud platform.

4. The method of claim 3, wherein the enhanced database view enhances the database view with processing logic.

5. The method of claim 3, wherein the enhanced database view enhances the database view with presentation instructions for data included in the database view.

6. The method of claim 1, further comprising presenting an extension user interface to the particular customer that enables selection of the at least one field.

7. The method of claim 1, wherein the application output is presented in an interactive user interface.

8. The method of claim 1, wherein the application output is presented in an electronic document.

9. The method of claim 1, further comprising presenting a modification tool to the particular customer to enable the particular customer to modify the application output to include the field.

10. The method of claim 9, wherein the data request for the field is received from the application when the application generates the application output.

11. A system comprising:
    one or more computers; and
    a computer-readable medium coupled to the one or more computers having instructions stored thereon which, when executed by the one or more computers, cause the one or more computers to perform operations comprising:
      automatically generating a data source extension (DSE) identifier (ID) prefix for a DSE that extends the data source, wherein a DSE ID comprises the automatically generated DSE ID prefix and a user-specified ID, and wherein the DSE ID and the automatically generated DSE ID prefix are unique and specific to the particular customer of the plurality of customers;
      receiving selection of at least one field to be included in the DSE that extends the data source, wherein the at least one field is not included in the data source, and wherein the selected at least one field has an associated field name comprising the automatically generated DSE ID prefix;
      storing extensibility metadata, in association with the particular customer of the plurality of customers, that defines the DSE, the extensibility metadata identifying the DSE ID, the automatically generated DSE ID prefix, the data source, the particular customer, and the selection of the at least one field that is not included in the data source;
      generating, at a first point in time, the DSE for the particular customer based on the extensibility metadata, wherein the DSE is specific to and is only applied to the particular customer of the plurality of customers;

in response to generating, at the first point in time, the DSE for the particular customer based on the extensibility metadata, preventing the generated DSE from conflicting with other DSEs generated after the first point in time based on the DSE being specific to and only applied to the particular customer and the DSE ID and the automatically generated DSE ID prefix being unique and specific to the particular customer;

receiving a data request, from a client device of a user associated with the particular customer, for a field included in the DSE that is not included in the data source;

using the DSE to retrieve a field value for the field included in the DSE that is not included in the data source based on the user being associated with the particular customer; and providing the field value in response to the data request.

12. The system of claim 11, wherein the data source is an OData service, wherein using the DSE to retrieve a field value for the field included in the DSE that is not included in the data source comprises:

mapping, using a mapping extension, the field in the OData service to a field in a core data service (CDS) view based on the extensibility metadata, wherein the extensibility metadata further comprises an extend view statement including the CDS view, the DSE ID, and a CDS field name associated with the field in the CDS view, and wherein the CDS field name comprises the automatically generated DSE ID prefix.

13. The system of claim 11, wherein the data source is an enhanced database view that enhances a database view in a database of the cloud platform.

14. The system of claim 13, wherein the enhanced database view enhances the database view with processing logic.

15. The system of claim 13, wherein the enhanced database view enhances the database view with presentation instructions for data included in the database view.

16. A computer program product encoded on a non-transitory storage medium, the computer program product comprising non-transitory, computer readable instructions for causing one or more processors to perform operations comprising:

receiving an extension request, from a particular customer of a plurality of customers, to extend a data source used to populate an application output of an application used by the plurality of customers of a cloud platform;

automatically generating a data source extension (DSE) identifier (ID) prefix for a DSE that extends the data source, wherein a DSE ID comprises the automatically generated DSE ID prefix and a user-specified ID, and wherein the DSE ID and the automatically generated DSE ID prefix are unique and specific to the particular customer of the plurality of customers;

receiving selection of at least one field to be included in the DSE that extends the data source, wherein the at least one field is not included in the data source, and wherein the selected at least one field has an associated field name comprising the automatically generated DSE ID prefix;

storing extensibility metadata, in association with the particular customer of the plurality of customers, that defines the DSE, the extensibility metadata identifying the DSE ID, the automatically generated DSE ID prefix, the data source, the particular customer, and the selection of the at least one field that is not included in the data source;

generating, at a first point in time, the DSE for the particular customer based on the extensibility metadata, wherein the DSE is specific to and is only applied to the particular customer of the plurality of customers;

in response to generating, at the first point in time, the DSE for the particular customer based on the extensibility metadata, preventing the generated DSE from conflicting with other DSEs generated after the first point in time based on the DSE being specific to and only applied to the particular customer and the DSE ID and the automatically generated DSE ID prefix being unique and specific to the particular customer;

receiving a data request, from a client device of a user associated with the particular customer, for a field included in the DSE that is not included in the data source;

using the DSE to retrieve a field value for the field included in the DSE that is not included in the data source based on the user being associated with the particular customer; and providing the field value in response to the data request.

17. The computer program product of claim 16, wherein the data source is an OData service, wherein using the DSE to retrieve a field value for the field included in the DSE that is not included in the data source comprises:

mapping, using a mapping extension, the field in the OData service to a field in a core data service (CDS) view based on the extensibility metadata, wherein the extensibility metadata further comprises an extend view statement including the CDS view, the DSE ID, and a CDS field name associated with the field in the CDS view, and wherein the CDS field name comprises the automatically generated DSE ID prefix.

18. The computer program product of claim 16, wherein the data source is an enhanced database view that enhances a database view in a database of the cloud platform.

19. The computer program product of claim 18, wherein the enhanced database view enhances the database view with processing logic.

20. The computer program product of claim 18, wherein the enhanced database view enhances the database view with presentation instructions for data included in the database view.

* * * * *